Patented July 7, 1925.

1,545,322

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

REGENERATION OF SUGAR-PURIFYING REAGENTS.

No Drawing. Application filed October 28, 1922. Serial No. 597,683.

*To all whom it may concern:*

Be it known that I, JOHN C. HEBDEN, a citizen of the United States, residing at New York, in the county of New York and State of New York, have invented certain new and useful Improvements in the Regeneration of Sugar-Purifying Reagents, of which the following is a specification.

The present invention relates to the purification of sugar and more particularly to the re-generation of the purifying agent used, whereby these agents, or a substantial portion thereof, will be rendered available for re-use and the impurities taken up or removed from the sugar juice or solution by the purifying agent are removed in solution, and hence do not appear as insoluble precipitates or filter cakes which would require removal as such and placing upon a dump or would otherwise require expensive or objectionable modes of disposal.

The invention is especially applicable to certain of the activated substances and to substrates prepared therewith such as those described in my prior applications Serial No. 466,493, filed May 3, 1921, and Serial No. 512,074, filed November 1, 1921, and which are used to take up or remove the impurities from the sugar juice or solution and comprise an activated substance or dye mordant or an insoluble base on which is deposited an activated substance or mordant which takes up or removes the impurities from the sugar juice or solution. The present invention provides a method of re-generating such activated substances and substrates which have been used and become spent, thus enabling the re-use of the activated substance or mordant and also of the substrate itself, thereby effecting a substantial saving in material and labor.

The substrate itself may consist of any of those referred to in my above-mentioned applications. For example, it may comprise an insoluble base such, for instance, as fuller's earth, kaolin or china clay, ground silica, dry alumina hydrate of the kind insoluble in water, kieselguhr or infusorial earth, ground wood or wood flour, or any other finely divided substance which is insoluble in water and upon which the activated substance or mordant can be precipitated. It is particularly advantageous, however, to employ bagasse in a finely-divided condition, owing to its porous or spongy nature and the fact that it can be readily prepared and can be readily removed from the sugar juice.

The activated substance or mordant, used with or without the substrate to take up or remove the impurities from the sugar juice or solution, comprises an insoluble basic compound which may consist of any of the insoluble hydroxides or tannates of metals, preferably the hydroxides or tannates of iron, alumina or titanium. Any one or more of these reagents can be prepared substantially as described in my prior application Serial No. 466,492, to produce an insoluble activated substance or mordant, either by itself or on the bagasse or other insoluble base used, and the activated substance or mordant or the activated substrate thus produced can be used substantially in accordance with the methods described in my above-mentioned applications, to take up or remove the impurities from the sugar juice or solution.

The activated substrates when used may be prepared substantially as described in my prior application Serial No. 466,493. For example, in preparing a substrate carrying an insoluble tannate as an activated substance or mordant, the procedure may be substantially as follows:

To a suspension of bagasse, infusorial earth or any other suitable insoluble finely-divided substance is added the salt of the metal, the insoluble tannate of which is to be produced. Where, for instance, the insoluble tannate of alumina is to be produced, there is added to the suspension sufficient sulfate of alumina to precipitate in and on the substrate, say one-fourth of 1 per cent of the weight of the sugar to be treated of alumina hydroxide. The precipitation is performed preferably hot by sodium carbonate or any alkali which will transpose alumina sulfate and precipitate the hydroxide, leaving a soluble sulfate. A fresh solution of tannic acid or any suitable tannin is then added to the substrate upon which the hydroxide is precipitated, the amount of tannic acid added being sufficient to combine with all or a part of the hydroxide. The insoluble tannate thus prepared is then washed with hot water to remove all products soluble therein, then filter-pressed and is then ready for use. The procedure for the preparation of other insoluble tannates, such as the tannates of iron and titanium would be the same as that for the tannate of alumina. Some insoluble tannates can be produced by adding to the substrate the salt of the metal whose tannate is required and adding to this mixture the tannic acid or tannin, thus precipitating the insoluble tannate.

The impurities taken up by the activated substance or mordant, or the activated substrate, when used for the treatment of a sugar juice or syrup, consist, as explained in my prior above-mentioned applications, of colors or dye stuffs, either mordant dyeing or basic or both, vegetable gums and similar compounds, nitrogenous, albuminous or protein substances which, however, are found chiefly in raw juices, and tannins, polyphenols and weak acids.

I have discovered that all of the impurities taken up and removed from the sugar juice or solution by the mordant or the activated substrate made from the insoluble hydroxide or the tannate of the metals, are all readily acted upon by caustic alkaline or strong alkaline solutions, while the inorganic compounds used in the preparation of the substrates are re-precipitated or re-generated by these alkaline solutions, as hydroxide, thus making it possible to recombine these hydroxides with tannic acid and similar compounds by adding a fresh solution of tannic acid or any suitable tannin set forth above in the description of the method of making the original substrate. I have also discovered that strong oxidizing re-agents in alkaline solutions will decompose the impurities taken up by the substrate and that the insoluble hydroxide can be re-generated therefrom. Any strong oxidizing re-agents can be used, such for example, as an alkaline solution of hydrogen peroxide or a hypochlorite or similar oxidizing compound. Strong acids, as for example, sulfuric or muriatic acid, may be used to dissolve the hydroxide component of the activated substance on the substrate, and this hydroxide can then be re-precipitated, using a caustic alkali for precipitation, thus causing the impurities, as well as the substances combined with the hydroxide to remain in the solution. The hydroxide thus precipitated upon the substrate can then be recombined with the tannic acid. An oxidizing agent, such for example, as a soluble chlorate or similar compound may be used in connection with an acid solution for decomposing the activated substance and the impurities on the substrate.

The method of treating substrates of the character hereinbefore described to re-generate them, is preferably as follows: The used substrate, carrying the impurities taken up or removed by the same in the treatment of the sugar juice or solution and which impurities consist of the mordant dyeing and basic dye stuffs, the gums and similar compounds, the nitrogenous compounds, as for instance, albuminous and protein bodies, and the tannins, polyphenols and weak acids, is suspended in water containing a sufficient quantity of caustic soda to decompose and render these impurities soluble. The hydroxide is thereby re-generated. The substrate may then be washed and it will then consist of a combination of the insoluble substance and a precipitate comprising the hydroxide of the metal originally used in making the substrate. The hydroxide can then be combined with the tannic acid or tannin to form an insoluble tannate, as has been set forth in the description of the initial or original making of the substrate, and is then ready for use in carrying out the purification methods described in my prior above-entitled applications.

Where an alkaline oxidizing re-agent is used, as for instance, alkaline hydrogen peroxide and an alkaline hypochlorite solution or similar compounds, a sufficient amount of such oxidizing solution is used to destroy the impurities above-mentioned and to re-generate and re-precipitate the hydroxide. The combination comprising the insoluble substance and the hydroxide thus produced can be washed and recombined with the tannic acid or tannin originally used with the hydroxide or the slight excess of oxidizing compound can be treated with an easily oxidizable substance, as for example, a sulfite or a thiosulfate, to destroy the oxidizing compound remaining in the solution, and the tannic acid, tannin or other original substance used can be added to this solution and thus re-generate the substrate as originally produced.

When strong acids or a strong acid and an oxidizing agent are used, the caustic alkali is added to neutralize the acid or acid oxidizing agent used and to precipitate the hydroxide originally produced. This combination of hydroxide and insoluble substance is then washed and can be recombined to produce the compound formed in the original substrate.

The herein described method enables substantial economies to be effected where substrates of the character herein referred to are used in sugar-purification processes. By re-generating the substrate, as is made possible by the present invention, there is a saving of the cost of the original insoluble base or material upon which the activated substance is precipitated, and when insoluble tannates are employed as the activated substance or mordant, there is an additional saving of the cost of the hydroxide used. The mechanical manipulations required to re-generate the substrate are practically no greater than those required for the initial or original making of the substrate.

I claim as my invention:—

1. The herein described improvement in the re-generation of a spent activated substance comprising originally a mordant capable of fixing basic and mordant-dyeing dyestuffs and insoluble in water and containing impurities removed from sugar juices or solutions, which comprises treating the spent substance containing said impurities with an alkali solution thus decomposing and rendering soluble the impurities and decomposing the spent activated substance.

2. The herein described method of re-generating a spent activated substance comprising originally a mordant capable of fixing basic and mordant-dyeing dyestuffs and insoluble in water and containing impurities removed from sugar juices or solutions, which comprises treating the spent activated substance with an oxidizing solution which will decompose and render soluble the impurities and will decompose the spent activated substance.

3. The herein described method of re-generating a spent mordant or activated substance comprising originally a mordant capable of fixing basic and mordant-dyeing dyestuffs and insoluble in water and containing impurities removed from sugar juices or solutions, which comprises suspending the spent mordant in an alkaline solution, thus decomposing and rendering soluble the impurities, and washing the spent mordant to remove the soluble impurities therefrom.

4. The herein described method of re-generating a spent mordant or activated substance comprising originally a mordant capable of fixing basic and mordant-dyeing dyestuffs and insoluble in water and carrying impurities removed from sugar juices or solutions, which comprises suspending the spent mordant in an alkaline solution, thus decomposing and rendering soluble the impurities and also decomposing the spent mordant, washing the spent mordant to remove the impurities thus rendered soluble, and precipitating the spent mordant.

5. The herein described method of re-generating a spent mordant or activated substance comprising originally a basic tannin compound insoluble in water and containing impurities removed from sugar juices or solutions, which comprises suspending the spent mordant in an alkaline solution thus decomposing and rendering soluble the impurities and decomposing the spent mordant, and re-generating the spent mordant as hydroxide.

6. The herein described method of re-generating the spent mordant or activated substance comprising originally a basic tannin compound insoluble in water and containing impurities removed from sugar juices or solutions, which comprises suspending the spent mordant in an alkaline solution thus decomposing and rendering soluble the impurities and decomposing the spent mordant, re-generating the spent mordant as hydroxide, washing the regenerated substance to remove the impurities, and recombining the hydroxide with a tannin compound to cause regeneration of the basic tannin compound.

7. The herein described method of re-generating a spent mordant or activated substance comprising originally a basic compound insoluble in water and containing impurities removed from sugar juices or solutions, which comprises suspending the spent activated substance in an alkaline solution containing an oxidizing agent, thus decomposing and rendering soluble the impurities and also re-generating the activated substance as hydroxide.

8. The herein described method of re-generating a spent mordant or activated substance comprising originally a basic tannin compound insoluble in water and containing impurities removed from sugar juices or solutions, which comprises suspending the spent activated substance in an alkaline solution containing an oxidizing agent, thus decomposing and rendering soluble the impurities and also re-generating the activated substance as hydroxide, washing the regenerated substance to remove the impurities, and re-combining the hydroxide with a tannin compound to cause regeneration of the basic tannin compound.

In testimony whereof I have hereunto set my hand.

JOHN C. HEBDEN.